United States Patent
Iida et al.

(10) Patent No.: US 7,055,213 B2
(45) Date of Patent: Jun. 6, 2006

(54) POWER BLOWER HAVING A DEBRIS-CATCHING COVER

(75) Inventors: Giichi Iida, Tokyo (JP); Tadashi Kamoshita, Nishi-tokyo (JP)

(73) Assignee: Kioritz Corporation, Tokyo (JP)

( * ) Notice: Subject to any disclaimer, the term of this patent is extended or adjusted under 35 U.S.C. 154(b) by 325 days.

(21) Appl. No.: 10/376,598

(22) Filed: Mar. 3, 2003

(65) Prior Publication Data

US 2003/0167594 A1 Sep. 11, 2003

(30) Foreign Application Priority Data

Mar. 7, 2002 (JP) .............................. 2002-061577

(51) Int. Cl.
*F01D 29/70* (2006.01)
*E01H 1/08* (2006.01)
*A47L 5/14* (2006.01)

(52) U.S. Cl. .......................................... 15/405; 15/330
(58) Field of Classification Search .................. 15/330, 15/405, 408, 412, 327.5; 224/201, 261, 600, 224/606, 627, 628, 907
See application file for complete search history.

(56) References Cited

U.S. PATENT DOCUMENTS

| | | | | |
|---|---|---|---|---|
| 4,658,778 A | * | 4/1987 | Gamoh et al. | 123/195 C |
| 5,011,058 A | * | 4/1991 | Sapp et al. | 224/261 |
| 5,052,073 A | * | 10/1991 | Iida | 15/327.5 |
| 5,195,208 A | * | 3/1993 | Yamami et al. | 15/326 |
| 5,457,846 A | * | 10/1995 | Kuwano et al. | 15/339 |
| 6,077,033 A | * | 6/2000 | Ishikawa | 415/98 |
| 6,324,721 B1 | * | 12/2001 | Doragrip | 15/326 |
| 2001/0005918 A1 | * | 7/2001 | Miyamoto | 15/326 |
| 2002/0067995 A1 | * | 6/2002 | Cifarelli | 417/234 |
| 2002/0174511 A1 | | 11/2002 | Iida et al. | 15/405 |

FOREIGN PATENT DOCUMENTS

| JP | 2000-73762 | * | 3/2000 |
|---|---|---|---|
| JP | 2001-241019 | | 9/2001 |

OTHER PUBLICATIONS

English Language Abstract of Japanese Patent Publication No. 2001-241019.

* cited by examiner

*Primary Examiner*—Terrence R. Till
(74) *Attorney, Agent, or Firm*—Michael Bednarek; Pillsbury Winthrop Shaw Pittman LLP

(57) ABSTRACT

A power blower includes a frame, and a blower mounted on the frame. An air intake port of the blower faces the frame. There is provided an air intake space between the blower and the frame. A debris-catching cover is constructed between the frame side and the blower side in a state in which it is mounted on both the frame and blower sides. The debris-catching cover inhibits debris from being sucked from the air intake space into the air intake port.

19 Claims, 5 Drawing Sheets

POWER BLOWER HAVING A DEBRIS-CATCHING COVER

This application claims the benefit of Japanese Patent Application No. 2002-61577, filed Mar. 7, 2002, which is herein incorporated by reference in its entirety.

BACKGROUND

1. Field of the Invention

The present invention relates to a power blower having a debris-catching cover. More particularly, it relates to a power blower having a frame and a blower, the blower being spaced apart from the frame by an air intake space and having an air intake port facing the frame.

2. Background of the Invention

As an example of a power blower, a backpack-type power blower is known, which is suitable for blowing fallen leaves, lawn clippings, or the like. This power blower has a frame, and a blower mounted on the frame. An air intake port of the blower faces the frame. There is provided an air intake space between the blower and the frame.

Some conventional power blowers have, on a blower case, a debris-catching ventilation cover that directly covers the air intake port in order to prevent debris such as fallen leaves from being sucked from the air intake port of the blower into the blower case. However, debris such as fallen leaves may stick to the debris-catching cover due to the intake airflow of the blower. Leaving this state as it is, may cause a problem in that the air intake efficiency of the blower is reduced, or that a prime mover for driving the blower seizes up due to an insufficient supply of cooling air. Therefore, an operator may need to remove the debris sticking to the debris-catching cover by hand.

More specifically, during operation, the operator may be required to halt the operation of the blower and remove the debris from the debris-catching cover by inserting his or her hand deep within the typically narrow air intake space. This may be a complicated and time-consuming effort, resulting in a reduced working efficiency.

BRIEF SUMMARY OF THE INVENTION

Accordingly, it is an object of the present invention to provide a power blower that inhibits the occurrence of problems such as the reduction of intake efficiency of the blower, and that facilitates the removal operation for debris sticking to the debris-catching cover.

The power blower according to an embodiment of the present invention includes a frame, and a blower mounted on the frame. An air intake port of the blower faces the frame. There is provided an air intake space between the blower and the frame. A debris-catching cover is constructed between the frame side and the blower side in a state in which it is mounted on both the frame and blower sides. The debris-catching cover inhibits debris from being sucked from the air intake space into the air intake port.

According to the present invention, because the debris-catching cover is constructed between the frame side and the blower side, the debris-catching cover can have a large overall ventilation area by, for example, increasing the number of ventilation holes. This prevents the debris-catching cover from hindering an intake action of the blower. This also allows the intake air flow passing through the debris-catching cover to be slowed down, thereby inhibiting debris such as fallen leaves from sticking to the debris-catching cover. Thus, the occurrence of the problem of reduction of intake efficiency of the blower due to the sticking of debris is prevented. In this case, even if debris stick to the debris-catching cover, they could be easily removed.

Furthermore, mounting the debris-catching cover to both the frame and blower sides allows the mounted state of the debris-catching cover to be firm.

In the present power blower, there are substantially no restrictions on mounting positions of the debris-catching cover with respect to the frame side and the blower side. For example, the debris-catching cover may be mounted on a case of the blower around the air intake port, and may simultaneously be mounted on the frame at positions along the longitudinal edges on the left and right sides of the frame. This method has an advantage that assembly work can be easily performed because, in the assembly process of the power blower, the debris-catching cover is mounted on the blower case in advance, and after the blower and the frame are coupled to each other, the debris-catching cover can be easily mounted on the frame side.

In the present invention, the arrangement may also be such that the debris-catching cover has a debris screen at a position spaced radially outward apart from the air intake port. This can increase the area (overall ventilation area) of the debris-catching cover, and thereby slow down the air intake flow in the debris screen, which may inhibit debris such as fallen leaves from sticking to the debris-catching cover. Even if debris stick to the debris-catching cover, the sticking debris could be easily removed.

Furthermore, in the present invention, the debris-catching cover may have the debris screen in each of the four directions up, down, left, and right with respect to the air intake space. This arrangement can increase the overall area of the debris screens, thereby enhancing the above-mentioned effects.

Moreover, in the present invention, the debris-catching cover may be formed of a material having a good vibration-absorbing property. This advantageously prevents vibrations occurring on the blower side from being directly transmitted to the frame side through the debris-catching cover.

Also, in the present invention, the arrangement may be such that the debris-catching cover is securely fixed with respect to the blower side, and that it is mounted with respect to the frame side in a state in which clearances of a predetermined size such as not to permit the passage of debris are provided. In this case, the clearance insulates the transmission of the vibrations occurring on the blower side to the frame side, thereby more advantageously increasing vibration-isolating effects on the frame side.

Furthermore, in the present invention, each of the mounting portions of the debris-catching cover with respect to the frame side and the blower side may be formed in an ear shape. This arrangement can minimize the contact areas of the debris-catching cover with the frame side and blower side, which more effectively enhances vibration-isolating property on the frame side.

Besides, in the present invention, the debris-catching cover may have incisions that do not permit the passage of debris and that reduce the amount of vibration transmission between the blower side and the frame side. These incisions also reduce the transmission amount of the vibrations occurring on the blower side to the frame side, thereby advantageously increasing vibration-isolating effects on the frame side.

The above and other objects, features, and advantages of the present invention will become clear from the following detailed description of the preferred embodiments of the invention in conjunction with the accompanying drawings.

DETAILED DESCRIPTION OF THE INVENTION

Figure 1:
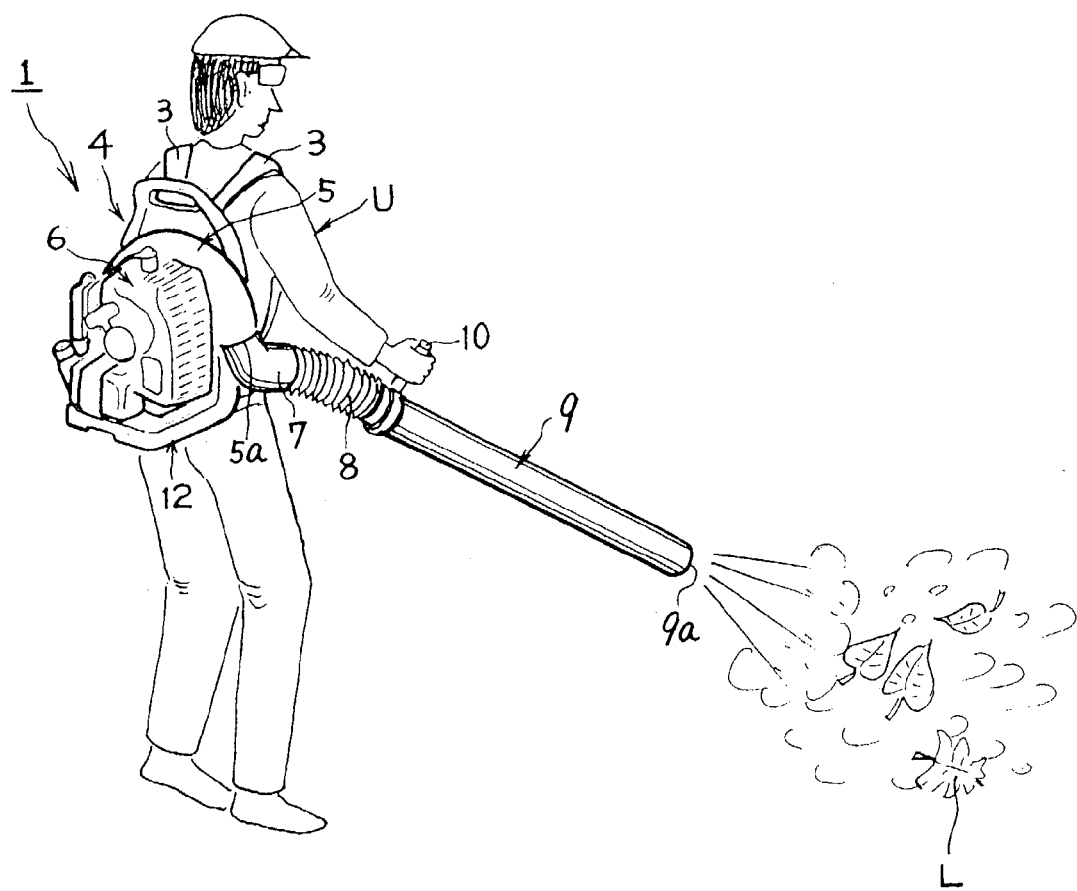
FIG. 1 is a perspective view illustrating a backpack-type power blower in a use, according to an embodiment of the present invention.

FIG. 1 shows a backpack-type power blower 1 as a power blower according to an embodiment of the present invention. The backpack-type power blower 1 is suitable for blowing fallen leaves L or the like.

Referring to FIG. 1, the backpack-type power blower 1 includes, a portable-type frame, and more specifically, a backpack frame 4 having a pair of left and right shoulder belts 3. The backpack frame 4 is equipped with a blower 5 of, for example, a centrifugal type, and an internal-combustion engine 6, such as an air-cooled two-cycle gasoline engine, as a prime mover for driving the blower 5. An air-blowing pipe 9 is connected to an air-discharging port 5a of the blower 5 via an elbow pipe 7 and a bellows hose 8.

An operator U puts the backpack frame 4 on his or her back with the pair of left and right shoulder belts 3, holds a grip 10 attached to the proximal end of the air-blowing pipe 9, and can efficiently perform a blowing operation to move debris such as fallen leaves L, by a large volume of blowing air discharged from a discharging port 9a located at the front end of the air-blowing pipe 9, while controlling the direction of the air-blowing pipe 9 and the rotational speed of the internal-combustion engine 6.

Figure 2:
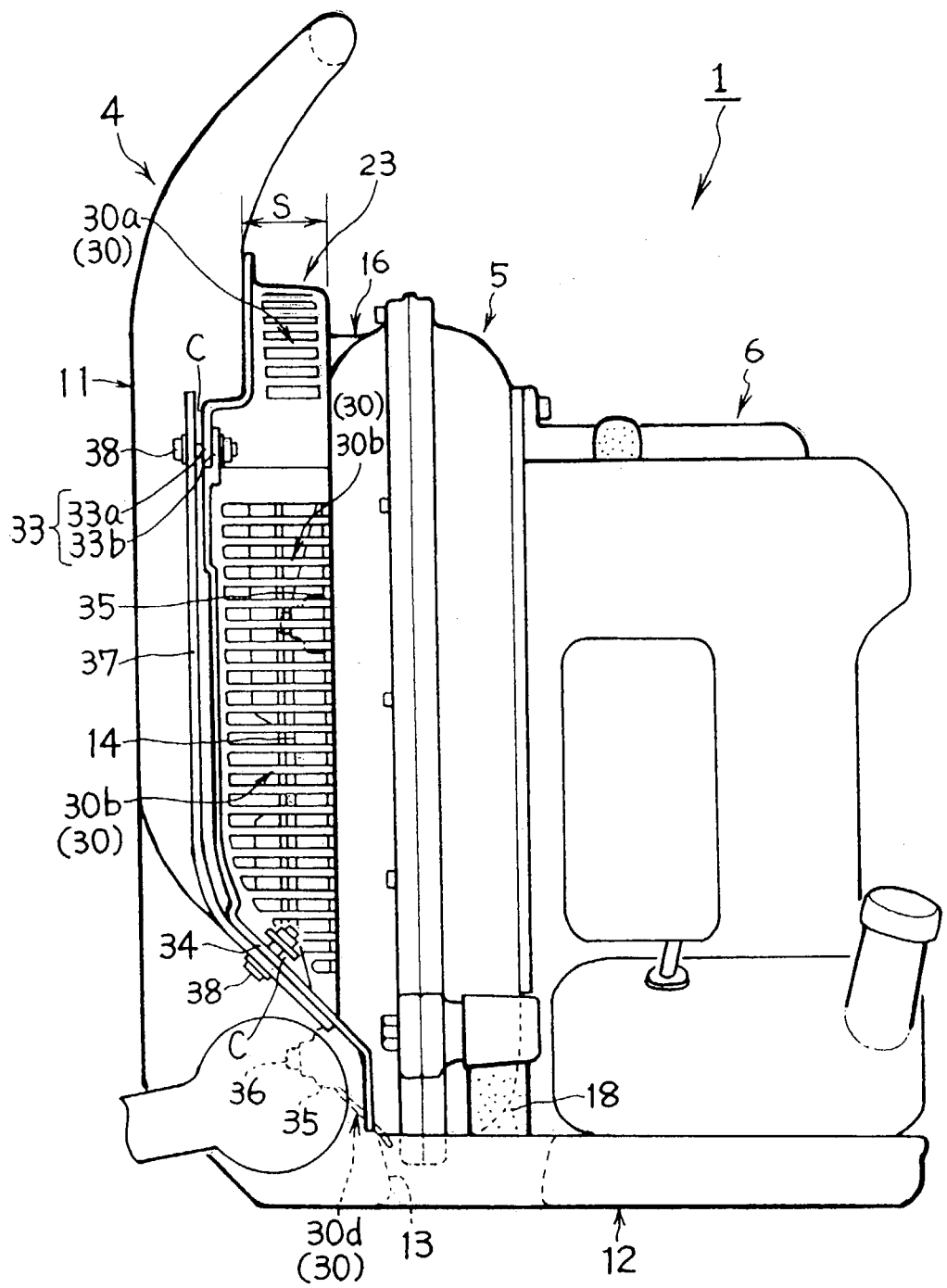
FIG. 2 is a left side view illustrating the main body portion of the backpack-type power blower shown in FIG. 1.

Referring to FIG. 2, the backpack frame 4 includes a back portion 11 extending in the substantially vertical direction, and a plate-shaped base portion 12 extending from the lower end of the back portion 11 rearward of the operator U in a substantially horizontal direction, and is formed in a substantially L-shape when viewed from the left side. The centrifugal blower 5 is disposed on the base portion 12 via appropriate vibration-insulating members 18 and 21. The internal-combustion engine 6 is directly connected to the centrifugal blower 5. The centrifugal blower 10 is located between the internal-combustion engine 6 and a back side 11r of the back portion 11. The base portion 12 has a blower receiving hole 13 formed therethrough in order to avoid contact with the centrifugal blower 5 and to secure an air intake passage from the downward direction of the blower 5. The backpack frame 4 may be integrally formed of, for example, a light and durable plastic material, by blow molding or the like.

Figure 3:
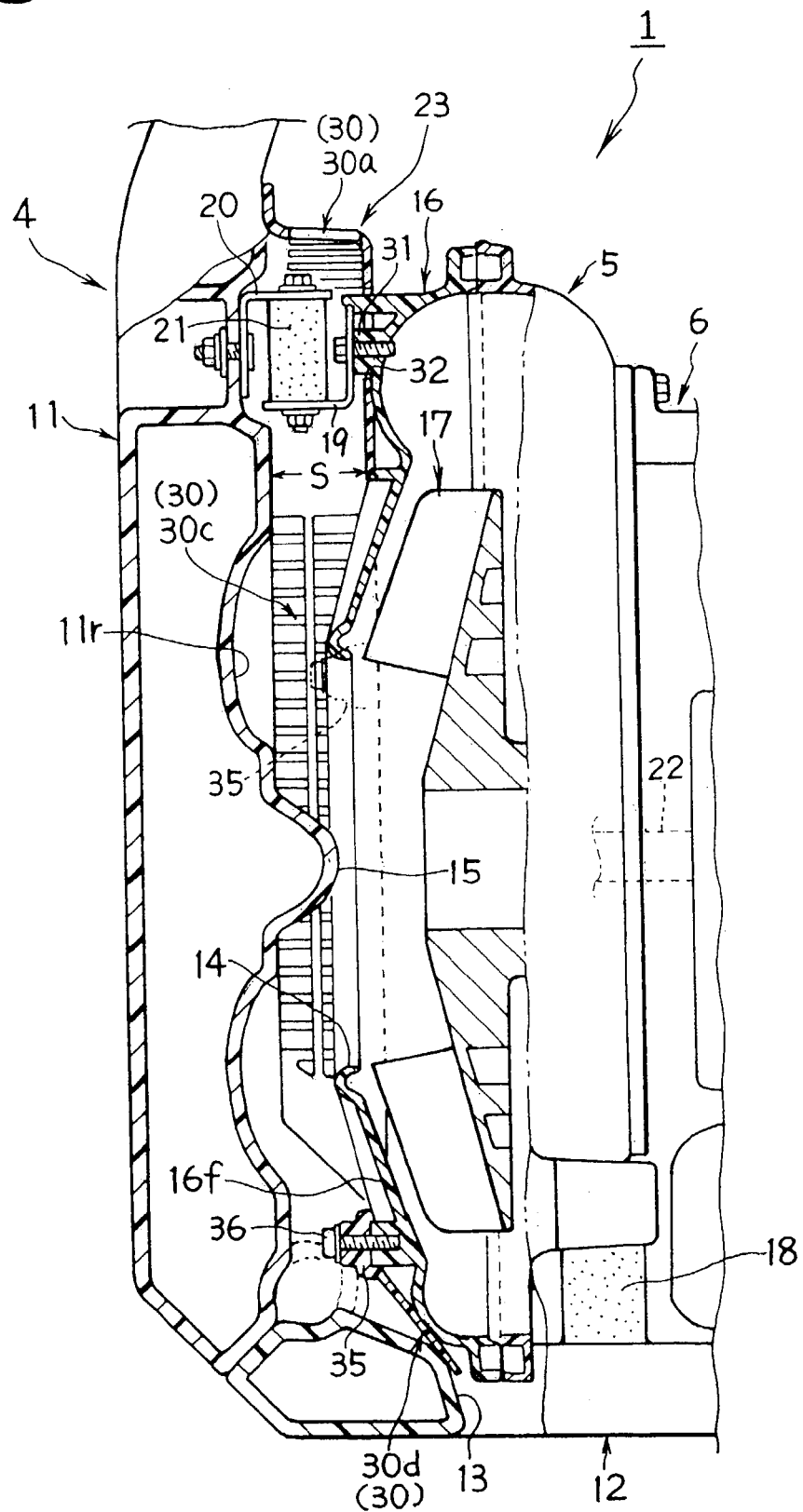
FIG. 3 is a vertical sectional view illustrating the main body portion of the backpack-type power blower, at the laterally central portion of the backpack frame shown in FIG. 2.

Referring to FIG. 3, an air intake port 14 of the centrifugal blower 5 faces the back side 11r of the back portion 11. An air intake space S of a predetermined dimension is provided between the back side 11r and the centrifugal blower 5. At the central portion of the back side 11r, the back portion 11 has an integrally formed air intake guide portion 15 that smoothly projects toward the central portion of the air intake port 14.

The centrifugal blower 5 includes a volute case 16 as a blower case and a centrifugal fan 17 rotatably supported in the volute case 16. As shown in FIG. 2, the centrifugal blower 5 is placed on the base portion 12 of the backpack frame 4 in a vibration-isolating manner, via the vibration-insulating members 18 such as rubber blocks provided at left and right lower portions of the volute case 16. Simultaneously, as shown in FIG. 3, the centrifugal blower 5 is supported by the back portion 11 in a vibration-isolating manner, via the vibration-insulating member 21 such as a rubber block disposed between a volute-case side fastening hardware 19 fastened to the upper-front central portion of the volute case 16 and a backpack-frame side fastening hardware 20 fastened to the back portion 11 of the backpack frame 4.

The centrifugal fan 17 is operationally connected to an output shaft 22 of the internal-combustion engine 6, and is rotationally driven by the rotation of internal-combustion engine 6. Air around the backpack frame 4 is sucked into the volute case 16 from the air intake port 14 through the air intake space S by the rotation of the centrifugal fan 17, and is discharged from, the air discharging port 5a (see FIG. 1) of the volute case 16 in a high-speed airflow.

As shown in FIGS. 2 and 3, an air-permeable debris-catching cover 23 is constructed between the backpack frame 4 and the centrifugal blower 5. The debris-catching cover 23 inhibits debris L such as fallen leaves from being sucked from the air intake space S into the air intake port 14. The debris-catching cover 23 is mounted on both the backpack frame 4 side and centrifugal blower 5 side. This allows the mounted state of the debris-catching cover 23 with respect to the backpack-type power blower 1 to be firm.

The debris-catching cover 23 is integrally molded into a thin-walled one using a material with a good vibration-absorbing property, such as rubber or soft polyethylene, in order to prevent the vibrations occurring on the centrifugal blower 5 side by the operation of the internal-combustion engine 6 as a vibration source, from being directly transmitted to the backpack frame 4 side, which is a human body contacting portion, through the debris-catching cover 23.

Figure 4:
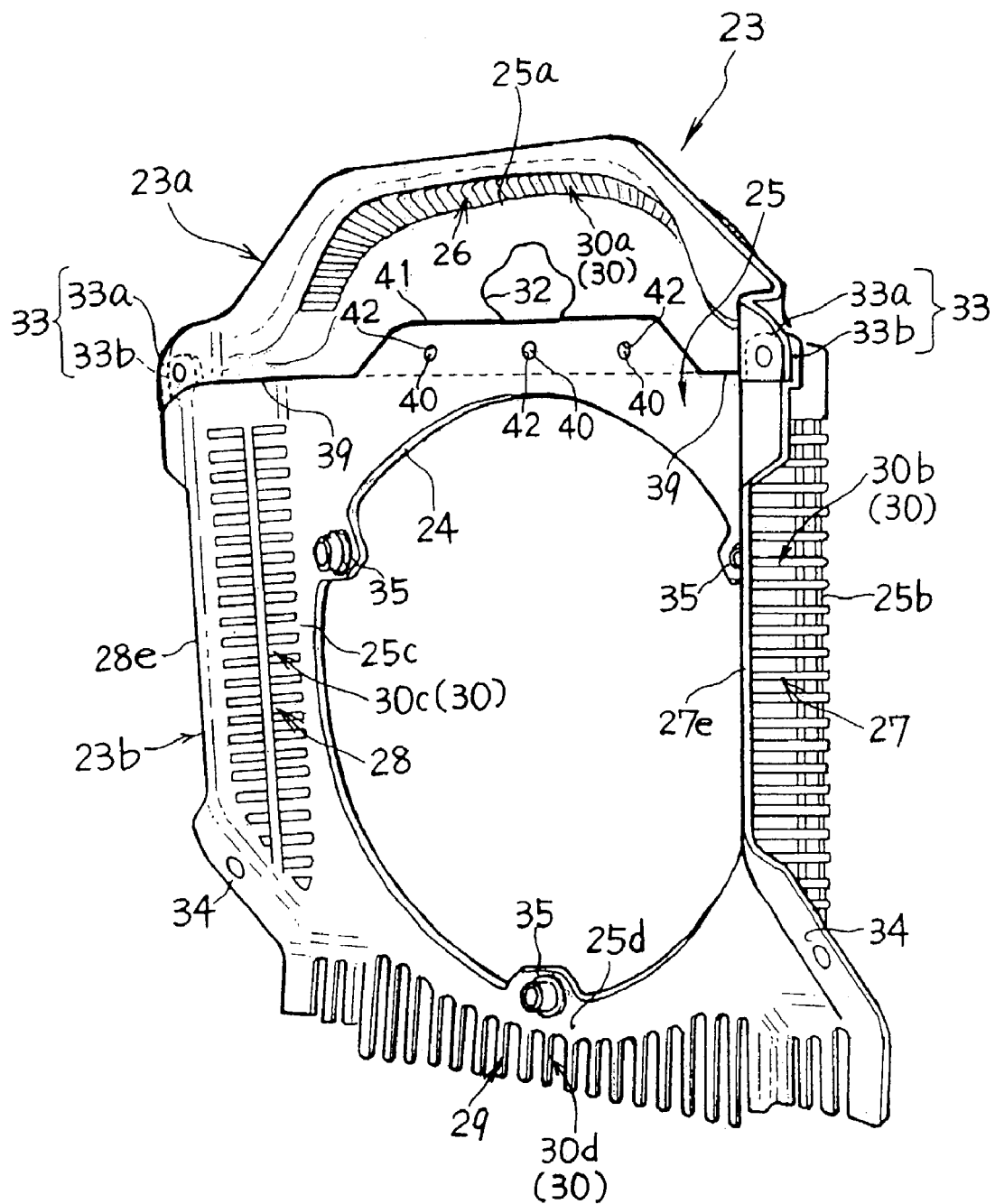
FIG. 4 is an overall perspective view illustrating a debris-catching cover according to the present invention.
Figure 5:
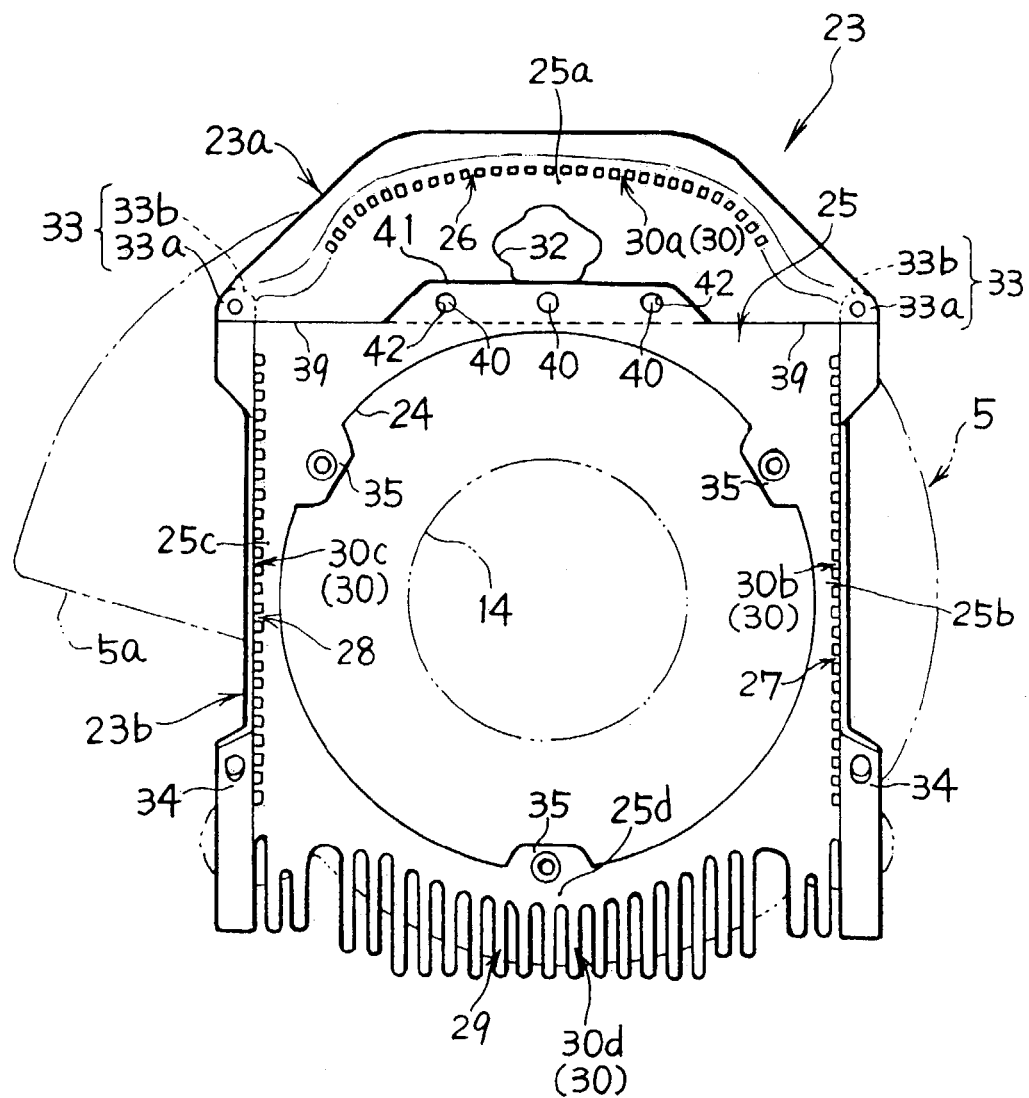
FIG. 5 is a front view illustrating the debris-catching cover in FIG. 2, as viewed from the backpack frame side.

As shown in FIGS. 4 and 5, the debris-catching cover 23 includes a substantially quadrangular tabular portion 25 having a circular opening with a diameter larger than that of the air intake port 14 of the centrifugal blower 5, at the central portion thereof; a top wall 26 that rises substantially at right angles from the upper edge 25a of the tabular portion 25 toward the backpack frame 4 side; left and right side walls 27 and 28 that rise substantially at right angles from the left and right longitudinal edges 25b and 25c of the tabular portion 25 toward the backpack frame 4; and a skirt portion 29 that extends downward from the lower edge 25d of the tabular portion 25. In addition, at the above-described top wall 26, left and right side walls 27 and 28, and skirt portion 29, the debris-catching cover 23 has debris screens 30 (i.e., an upper debris screen 30a, a left-side debris screen 30b, a right-side debris screen 30c and a lower debris screen 30d) that each have good air-permeability with many ventilation holes provided, but that each do not permit the passage of debris L such as fallen leaves. The ventilation hole portion of each of the debris screens 30 is formed in a mesh shape or grid shape, or formed as a slit group comprising many slits.

At an upper portion of the tabular portion 25 of the debris-catching cover 23, there is provided a mounting seat through-hole 32 that receives a mounting seat 31 (see FIG. 3) for fastening the volute-case side fastening hardware 19 to the volute case 16.

Also, the debris-catching cover 23 integrally includes frame-side mounting portions 33 and 34 for mounting the debris-catching cover 23 to the backpack fame 4 side, and blower-side mounting portions 35 for mounting the debris-catching cover 23 to the centrifugal blower 5 side.

As illustrated in FIG. 2, in the state in which the debris-catching cover 23 is mounted on the backpack frame 4 side and the centrifugal blower 5 side by the frame-side mounting portions 33 and 34 and the blower-side mounting portions 35, respectively, the debris screen 30 is located between the backpack frame 4 and the centrifugal blower 5 so as to surround the outer peripheral portion of the air intake port 14, thereby air-permeably blocking the air intake space S. This inhibits debris L such as fallen leaves from being sucked from the air intake space S into the air intake port 14 because of being entrained in an air intake flow caused by an operation of the centrifugal blower 5.

In the debris-catching cover 23, it is desirable that the debris screen 30 is formed at a position spaced apart from the air intake port 14 of the centrifugal blower 5 radially outward as wide as possible. This can increase the overall ventilation area of the debris screen 30, thereby slowing down the air intake flow in the debris screen 30, which inhibits debris L such as fallen leaves from sticking to the debris-catching cover. Even if debris L stick to the debris-catching cover, they could be easily removed by virtue of oscillations in operation or by hand. In the present embodiment, within the range of the profile of the centrifugal blower 5 or the backpack frame 4 projected in the back and forth directions, the debris screen 30 is located at a position spaced apart from the air in take port 14 as wide as possible.

As described above, in the present embodiment, the debris screens 30 are provided in the four directions up, down, left, and right. This can increase the overall area of the debris screen 30, thereby enhancing the above-described effects.

As illustrated in FIG. 3, the lower debris screen 30d, which is formed in a comb-shape at the skirt portion of the debris-catching cover 23, is in elastic contact with the front edge of the blower receiving hole 13 of the base portion 12, thereby inhibiting debris L from entering from blower receiving hole 13 into the air intake port 14 side.

As illustrated in FIGS. 4 and 5, in the present embodiment, the debris-catching cover 23 has three blower-side mounting portions 35 extended in an ear form at mutually equal angular distances in a manner such that they extend radially inward from the opening 24 of the tabular portion 25. These blower-side mounting portions 35 are fastened to a front surface 16f of the volute case 16 using fasteners 36 such as screws (see FIG. 3). As a result, there is no room for debris to pass through, between the debris-catching cover 23 and the volute case 16.

On the other hand, as shown in FIG. 4, each of the two combinations of the frame-side mounting portions 33 and 34 are formed in an ear shape in a manner such that they extend outward in the left and right directions from the upper and lower portions of respective one of the edges 27e and 28e of the left and right side walls 27 and 28. In the assembly process of the power blower 1, each of the two combinations of the frame-side mounting portions 33 and 34 are mounted on the upper and lower portions of respective one of the longitudinal edges 37 extended on the left and right sides of the back portion 11, using appropriate fasteners 38 such as screws, after the centrifugal blower 5 equipped with the debris-catching cover 23 in advance is caused to be supported on the backpack frame 4 in a vibration-insulating manner (see FIG. 2).

As in the case of the mounting method for the blower-side mounting portions 35 with respect to the volute case 16, the two combinations of the frame-side mounting portions 33 and 34 may be securely fixed to respective ones of the longitudinal edges 37 extending on the left and right sides of the backpack frame 4, with the fasteners 38. In this embodiment, however, as shown in FIG. 2, in order to enhance vibration-insulating effects, each of the two combinations of the frame-side mounting portions 33 and 34 are mounted on the respective one of the left and right longitudinal edges 37 using stoppers and the fasteners 38 each with a rubber grommet, in a state in which there is provided a clearance C of a predetermined size such as not to permit the passage of debris, between each of the two combinations of the frame-side mounting portions 33 and 34 and the respective one of the left and right longitudinal edges 37. The clearances C inhibit vibrations occurring on the centrifugal blower 5 side from being transmitted to the backpack frame 4 side through the debris-catching cover 23, thereby advantageously increasing vibration-isolating effects on the backpack frame 4 side.

Also, in this embodiment, each of the frame-side mounting portions 33 and 34, and each of the blower-side mounting portions 35 is formed in an ear shape, so that the contact areas of the debris-catching cover 23 with the backpack frame side 4 and the centrifugal blower 5 side are minimized. This arrangement also inhibits vibrations occurring on the centrifugal blower 5 side from being directly transmitted to the backpack frame 4 side through the debris-catching cover 23.

Furthermore, as illustrated in FIGS. 4 and 5, the debris-catching cover 23 has incisions or slits 39 that do not permit the passage of debris, and that reduce the amount of vibration transmission between the centrifugal blower 5 side and the backpack frame 4 side through the debris-catching cover 23. In this embodiment, in order to miniaturize a molding die for the debris-catching cover 23, the debris-catching cover 23 is formed of a plurality of cover pieces 23a and 23b, and the plurality of cover pieces 23a and 23b is made usable by coupling together by an appropriate means. Here, the debris-catching cover 23 is arranged so that the incisions 39 are formed between the plurality of the cover pieces 23a and 23b.

More specifically, with consideration given to the mountability of the vibration-insulating members 21, the debris-catching cover 23 according to this embodiment is formed of the upper-side cover piece 23a having a trapezoidal shape in a plan view and including the top wall 26 and the mounting seat through-hole 32, and the lower-side cover piece 23b having a substantially square shape in a plan view and including the left and right side walls 27 and 28 and the skirt portion 29. At the laterally central portion of the upper edge of the lower cover piece 23b, a tongue 41 having coupling holes 42 is projected upward. Coupling projections 40 formed at lower portions of the upper cover piece 23a can be engaged into the coupling holes 42 in a press-fit manner. For the above-described reason, in this embodiment, the incisions 39 extending inward from the left and right outer edges of the debris-catching cover 23 are formed between the upper cover piece 23a and the lower cover piece 23b. These incisions 39 also contribute to the vibration insulation by the debris-catching cover 23.

As shown in FIGS. 2 and 4, in this embodiment, in order to reliably prevent the entering of debris from the incisions 39 into the air intake port 14 side, the frame-side mounting portions 33 are constituted of the ear-shaped mounting portions 33a formed on the upper-side cover piece 23a and the ear-shaped mounting portions 33b formed on the lower-side cover piece 23b, and each of the ear-shaped mounting portions 33a is superimposed on a respective one of the ear-shaped mounting portions 33b to mount it to the backpack frame 4 side with the fastener 38.

As described above, the debris-catching cover 23 performs a superior debris-catching function at a position apart from the air intake port 14 of the blower 5. Moreover, since the debris-catching cover 23 is mounted on both the backpack frame 4 side and centrifugal blower 5 side, it performs the function of a main-body drop-off preventing member when the vibration-insulating members 18 and 21 break down.

In addition, according to the present embodiment, the debris-catching cover 23 itself not only has various features suitable for vibration insulation, but also consideration for vibration insulation is given to the way of mounting it to the backpack frame 4 side as described above. Therefore, even though the debris-catching cover 23 is mounted on both the backpack frame 4 side and centrifugal blower 5 side, there is less fear of large vibrations being transmitted from the blower 5 side to the backpack frame 4 side through the debris-catching cover 23.

While the present invention has been described with reference to what are at present considered to be the preferred embodiments, it is to be understood that various changes and modifications may be made thereto without departing from the present invention in its broader aspects and therefore, it is intended that the appended claims cover all such changes and modifications that fall within the true spirit and scope of the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A power blower, comprising:
    a frame;
    a blower spaced apart from said frame by an air intake space, and having an air intake port facing said frame; and
    a debris-catching cover constructed between said frame and said blower with said debris-catching cover mounted on both the frame and blower sides, and said debris-catching cover configured to inhibit debris from being sucked from said air intake space into said air intake port,
    wherein the debris-catching cover includes a substantially quadrangular tabular portion having a circular opening with a diameter larger than that of the air intake port at a central portion thereof, a top wall, right and left side walls, and a skirt portion, and
    wherein each of the top wall, the right and left side walls and the skirt portion includes debris screens.

2. The power blower according to claim 1, wherein said debris-catching cover is mounted on a case of said blower around said air intake port, and wherein said debris-catching cover is mounted on said frame at positions along the longitudinal edges on the left and right sides of said frame.

3. The power blower according to claim 1, wherein said debris-catching cover has a debris screen at a position spaced radially outward apart from said air intake port.

4. The power blower according to claim 3, wherein said debris-catching cover comprises debris screen portions facing up, down, left, and right with respect to said air intake space.

5. The power blower according to claim 1, wherein said debris-catching cover is formed of a material having a good vibration-absorbing property.

6. The power blower according to claim 1, wherein said debris-catching cover is securely fixed with respect to said blower, and wherein said debris-catching cover is mounted with respect to said frame with clearances of a predetermined size for preventing passage of debris.

7. The power blower according to claim 1, wherein each of the mounting portions of said debris-catching cover with respect to said frame and said blower is formed in an ear shape.

8. The power blower according to claim 1, wherein said debris-catching cover defines a plurality of slits for preventing passage of debris, and for reducing the amount of vibration transmission between said blower and said frame through said debris-catching cover.

9. A debris-catching cover constructed between a frame and a blower that is spaced apart from said frame by an air intake space, that has an air intake port facing said frame, and that inhibits debris from being sucked from said air intake space into said air intake port, said debris-catching cover comprising:
    frame-side mounting portions for mounting said debris-catching cover to said frame;
    blower-side mounting portions for mounting said debris-catching cover to said blower, the debris-catching cover including a substantially quadrangular tabular portion having a circular opening with a diameter larger than that of the air intake port at a central portion thereof, and
    a top wall, a left and right side wall and a skirt portion, each of which includes a debris screen.

10. The debris-catching cover according to claim 9, wherein said blower-side mounting portions are formed at positions around said air intake port, and wherein said frame-side mounting portions are formed at positions along the longitudinal edges on the left and right sides of said frame.

11. The debris-catching cover according to claim 10, further comprising a debris screen at a position spaced radially outward apart from said air intake port, said debris-catching cover mounted by said frame-side mounting portion and said blower-side mounting portion.

12. The debris-catching cover according to claim 11, wherein said debris screen comprises a portion facing up, down, left, and right with respect to said air intake space.

13. The debris-catching cover according to claim 9, wherein the whole of said debris-catching cover is formed of a material having a good vibration-absorbing property.

14. The debris-catching cover according to claim 9, wherein said frame-side mounting portions and said blower-side mounting portions are each formed in an ear shape.

15. The debris-catching cover according to claim 9, further comprising slits for presenting passage of debris, and for reducing the amount of vibration transmission between said blower and said frame through said debris-catching cover.

16. A debris-catching cover configured to be mounted between a blower having an air intake port and a frame of a power blower, comprising:
   a substantially quadrangular tabular portion having a circular opening with a diameter larger than that of the air intake port at a central portion thereof, a top wall, a right and left side walls, and a skirt portion;
   a plurality of screen portions positioned on the top wall, the right and left side walls and the skirt portion of said cover for preventing debris passage into a space created between said blower and said frame, said space in fluid communication with the air intake port of said blower, said screen portions allowing passage of air into said space.

17. The debris-catching cover according to claim 16, wherein during operation of the power blower, the velocity of air passing through any single screen portion is less than the velocity of air flowing into said intake port.

18. The debris-catching cover according to claim 16, wherein when said debris-catching cover is mounted on said power blower, said cover comprises screen portions facing up, down, left, and right with respect to said air intake port.

19. The debris-catching cover according to claim 16, wherein said cover is made of a material having a good vibration-absorbing property.

* * * * *